(12) United States Patent
Moloney et al.

(10) Patent No.: US 11,931,937 B2
(45) Date of Patent: Mar. 19, 2024

(54) METHOD AND SYSTEM FOR MOLDING AN ARTICLE

(71) Applicant: The Gillette Company LLC, Boston, MA (US)

(72) Inventors: Michael John Moloney, Brimfield, MA (US); Robert Cardillo, Andover, MA (US); Charles Thaxter, Sr., Townsend, MA (US)

(73) Assignee: The Gillette Company LLC, Boston, MA (US)

( * ) Notice: Subject to any disclaimer, the term of this patent is extended or adjusted under 35 U.S.C. 154(b) by 0 days.

(21) Appl. No.: 17/736,706

(22) Filed: May 4, 2022

(65) Prior Publication Data

US 2022/0355520 A1 Nov. 10, 2022

Related U.S. Application Data

(60) Provisional application No. 63/185,683, filed on May 7, 2021.

(51) Int. Cl.
*B29C 45/27* (2006.01)

(52) U.S. Cl.
CPC .. *B29C 45/2725* (2013.01); *B29K 2995/0092* (2013.01); *B29K 2995/0093* (2013.01)

(58) Field of Classification Search
CPC ..... B29C 45/18; B29C 45/232; B29C 45/234; B29C 45/021; B29C 2045/025
See application file for complete search history.

(56) References Cited

U.S. PATENT DOCUMENTS

| | | | | |
|---|---|---|---|---|
| 4,130,517 A | * | 12/1978 | Lundberg | C08G 81/00 523/108 |
| 4,295,573 A | * | 10/1981 | Terry | B05B 7/262 118/302 |
| 6,216,752 B1 | * | 4/2001 | Bailey | B29C 31/041 425/572 |
| 2004/0166189 A1 | | 8/2004 | Babin | |
| 2005/0015990 A1 | | 1/2005 | Barone et al. | |
| 2005/0226956 A1 | * | 10/2005 | Fischer | B29C 45/2738 425/549 |
| 2007/0278708 A1 | * | 12/2007 | Nahill | B29C 45/2806 425/572 |

(Continued)

OTHER PUBLICATIONS

15991 PCT Search Report and Written Opinion for PCT/US2022/072130 dated Jul. 19, 2022, 12 pages.

*Primary Examiner* — Emmanuel S Luk
(74) *Attorney, Agent, or Firm* — John M. Lipchitz

(57) ABSTRACT

A method of molding a personal care product, a manifold, and a cosmetic product molding apparatus are provided. In one embodiment, the method of molding a personal care product comprises: moving a material through a temperature controlled manifold, opening one or more injection valves between the temperature controlled manifold and one or more mold cavities, injecting the material at a controlled pressure into the one or mold cavities in a closed position to form one or more articles, closing the one or more injection valves between the temperature controlled manifold and one or more mold cavities after injecting the material into the one or more mold cavities, opening the one or more mold cavities, and removing the one or more articles from the one or more mold cavities.

10 Claims, 7 Drawing Sheets

(56) References Cited

U.S. PATENT DOCUMENTS

| | | | |
|---|---|---|---|
| 2008/0033073 A1* | 2/2008 | Sellergren | B01J 20/268 526/204 |
| 2009/0053347 A1* | 2/2009 | Shimodo | B29C 45/78 425/143 |
| 2010/0198133 A1* | 8/2010 | Dougherty, Jr. | A61F 13/2082 428/338 |
| 2012/0216408 A1 | 8/2012 | Cook et al. | |
| 2012/0241125 A1* | 9/2012 | Hattori | B29C 45/7306 165/96 |
| 2012/0291885 A1* | 11/2012 | Altonen | B29C 45/77 137/511 |
| 2016/0031136 A1* | 2/2016 | Huang | B29C 45/77 425/572 |
| 2016/0151948 A1* | 6/2016 | Jenko | B29C 45/2737 425/549 |
| 2018/0065286 A1* | 3/2018 | Pruitt | B29C 45/2673 |
| 2018/0194050 A1* | 7/2018 | Galati | B29C 45/281 |
| 2020/0078997 A1* | 3/2020 | Higuchi | B29C 45/1642 |

* cited by examiner

METHOD AND SYSTEM FOR MOLDING AN ARTICLE

FIELD OF THE INVENTION

One or more embodiments herein include systems and methods for molding articles within one or more closed cavities, and more particularly, to recirculating low viscosity materials prior to injecting into one or more closed cavities.

BACKGROUND OF THE INVENTION

New advances are being made in materials for cosmetics and pharmaceuticals, as well as other industries, that can deliver enhanced consumer benefits such as by delivering various ingredients to skin, hair, and body. These materials may generally have lower in-process viscosities such as in-process viscosities in a heated state than common thermoplastics, which can be a particular challenge when forming articles using conventional injection molding systems. These materials may also include multi-phase systems that generally include a dispersed phase and a continuous phase. However, these materials can be difficult to process in a heated/molten state because of thermal sensitivity of ingredients and/or settling of multi-phase systems. The issue of thermal sensitivity and settling may be further exacerbated when using conventional injection molding systems to manufacture smaller sized articles that are molded into closed cavities. Smaller articles or components have lower total injection volumes, which results in longer residence times prior to the material being injected into the closed cavity.

Razors for wet shaving typically include a blade unit carried by a handle, the blade unit including one or more elongate blades, each with a sharpened edge (e.g., a rectilinear sharpened edge). The blade unit may be fixedly mounted on the handle with the intention that the entire razor be discarded when the blade edge or edges have become dulled. Alternatively, the blade unit can be detachably connected to the handle to enable replacement of a used blade unit with a fresh blade unit. Replaceable blade units are commonly referred to as cartridges.

Some shavers, often women or male/female athletes, use this type of razor in the shower. For example, when shaving one's legs, a person will often apply a film or lather of soap to an area of skin to be shaved, shave that area, apply soap to another area, and shave that area. This process is repeated until shaving is complete. Shaving in this manner may be difficult and frustrating, as it generally requires the shaver to hold a wet bar of soap in one hand while wielding a razor in the other hand, often while standing in an awkward position on a slippery shower floor. Attempts have been made to address this problem by providing soap or other lubricious materials mounted on the razor and/or cartridge. The process of securely attaching soap or other lubricious component to the razor and/or cartridge can be difficult to achieve in a cost-effective manner.

Accordingly, there is a need to develop processes and systems that facilitate the molding of components while minimizing thermal degradation and settling of multi-phase materials. Furthermore, there is a need for processes and systems to manufacture small components that can be attached to other components as part of the molding process while minimizing thermal degradation and settling of multi-phase materials.

SUMMARY OF THE INVENTION

In one aspect, the invention features a method of molding a personal care product. The method can include moving a material through a temperature controlled manifold, opening one or more injection valves between the temperature controlled manifold and one or more mold cavities, injecting the material at a controlled pressure into the one or more mold cavities in a closed position to form one or more articles, closing the one or more injection valves between the temperature controlled manifold and one or more mold cavities after injecting the material into the one or more mold cavities, opening the one or more mold cavities, and removing the one or more articles from the one or more mold cavities.

In another aspect, the invention features a manifold. The manifold can include a supply passage for supplying one or more materials, a return passage for recirculating the one or more materials, and one or more injection valves for filling one or more corresponding mold cavities. It is noted that the supply passage and the return passage can be in fluid communication with the one or more injection valves.

In a further aspect, the invention features a cosmetic product molding apparatus. The cosmetic product molding apparatus can include a recirculation loop which can include a recirculation pump that moves a low-viscosity material through a temperature controlled manifold. The cosmetic product molding apparatus can additionally include one or more actuators that open one or more injection valves between the temperature controlled manifold and one or more mold cavities to enable flow of the low-viscosity material at a controlled pressure into the one or more mold cavities in a closed position to form one or more articles. The actuators can close the one or more injection valves between the temperature controlled manifold and one or more mold cavities after the low-viscosity material flows into the one or more mold cavities. The cosmetic product molding apparatus can additionally include an opener that opens the one or more mold cavities, and an ejector that removes the one or more articles from the one or more mold cavities.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

DETAILED DESCRIPTION OF THE INVENTION

Figure 1A:
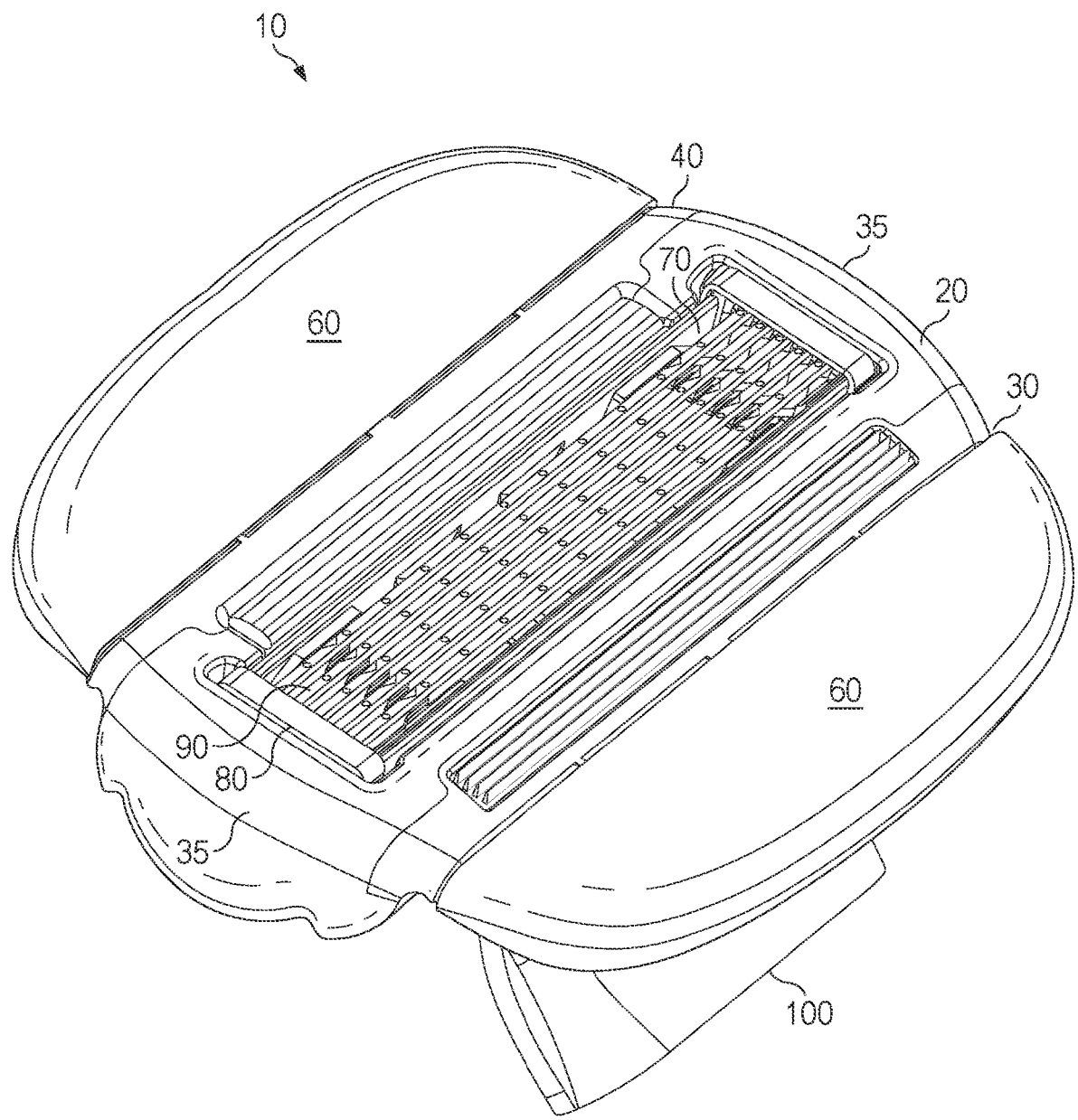
FIG. 1A is a perspective view of a shaving razor having a molded shaving aid composition.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Embodiments of the systems and methods herein facilitate injection molding of articles, particularly articles derived from low-viscosity molten materials and in particular multiphase materials and/or materials comprising thermally sensitive ingredients. The systems and methods may be beneficial in producing smaller size articles (e.g., 1-5 grams) where lower injection volumes result in higher residence times that result in increased thermal degradation and settling in conventional injection molding systems. Embodiments herein can further include recirculating (e.g., continuously recirculating) the low-viscosity molten material. This recirculation helps address problems associated with settling and/or separation of phases for molten multiphase materials.

Molded shaving aid compositions may be thermally sensitive and/or prone to settling (e.g., for multiphase materials). The molded shaving aid compositions may also need to be attached to other components. Referring to FIG. 1A, a perspective view of a shaving razor 10 is illustrated. The shaving razor 10 may comprise a blade unit 80. The blade unit 80 may comprise a housing 20 (e.g., a plastic housing) with a shaving aid component 60 attached thereto. The shaving aid 60 may be disposed in any configuration relative to the housing and/or blade unit 80 such as toward a front of the housing 20 with the one or more blades 90 between the guard and a rear of the housing 20. It is noted that the blade unit 80 can be disposed within an aperture 70 of the housing 20. As will be described in greater detail below, one or more shaving aid components 60 may be attached to the housing as part of the molding process. The shaving aid components 60 may be molded within a closed cavity and ejected. In some embodiments, the shaving aid components 60 can be co-molded with the housing 20 or insert molded to the housing 20. It is understood that the shaving aid components 60 may also be insert molded or co-injection molded to an intermediate component that is later attached to the housing 20. The housing 20 can comprise a front edge portion 30 and a rear edge portion 40, which run parallel to one another. The housing 20 can also comprise two opposing side edge portions 35 disposed perpendicularly to the front and rear edge portions 30 and 40. It is further noted that a hood 100 can pivot relative to the housing 20.

Figure 1B:
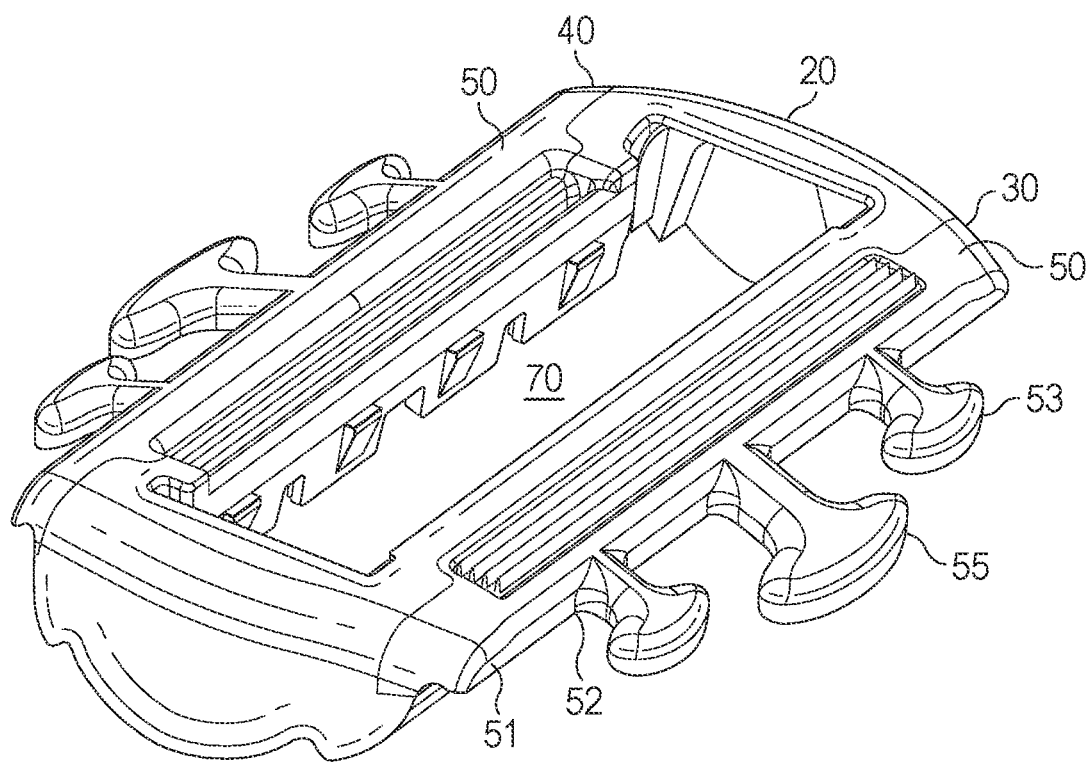
FIG. 1B is a perspective view of a housing of the shaving razor of FIG. 1A.

FIG. 1B illustrates the housing 20 with a wing 50 disposed at the front and rear edge portions 30 and 40. The wing 50 comprises a plurality of wing tabs 55 that extend from a base 51 of the wing 50. Each wing tab 55 has a proximate end 52 and a distal end 53. In this embodiment, the wing tabs 55 are independently movable at their respective distal ends 53. In certain embodiments, the shaving aid component 60 of FIG. 1A may be co-injection molded or insert molded to the wing 50 and/or the housing 20.

Materials herein (e.g., for shaving aid components 60) can comprise cosmetic materials and/or other consumer product materials, such as those employed for use in lip balms, lipsticks, deodorants, antiperspirants, soaps, skin cosmetics, or other products which may comprise exfoliants, sunscreen actives such as zinc oxides, oxybenzone, avobenzone, octisalate, octocrylene, homosalate, or octinoxate. Cosmetic materials utilized herein can comprise lubricants such as lubricating sticks or lubricating members for hair removal devices such as razors. It is noted that materials utilized herein can be further applicable in healthcare applications. Materials herein can be injected into molds to form products such as components for blades and razors, shaving aids, deodorants, lipsticks, soaps, tablets, capsules, drug products such as topical, oral, and/or implantable solid drug forms, or other products. Such products can be injected onto substrates such as a housing or an applicator which may be disposed in the mold during injection of the material.

One or more embodiments herein can apply to any of a number of different materials that have low-viscosity and/or low-viscosity materials for forming cosmetics products or cosmetics packaging (referred to herein as "cosmetic materials") and/or low-viscosity materials for forming consumer products or consumer packaging. The terms "material," "low-viscosity material," "cosmetic material" and/or "consumer product material" shall be used interchangeably herein.

As referenced herein, low-viscosity means materials having a viscosity less than or equal to 10,000 centipoise (cP) and often in the range of 100-5,000 cP or even less than 100 cP. Materials herein can comprise relatively low in-process viscosities such as molten viscosities as compared to plastic materials commonly used in injection molding, which often comprise viscosities of 1,000,000-2,000,000 cP during processing. It is appreciated that plastic materials used in conventional injection molding systems to not literally "melt" but are softened (e.g. by heating above their glass-transition temperature) in order to enable the material to flow through the system.

Conventionally, injecting molding methods and apparatuses are used with plastics with polymeric structuring materials that soften, rather than melt and/or dissolve, when heated. Such plastic and/or polymeric materials do not fully melt and thus generally maintain some substantial viscosity, even when heated (e.g. beyond their glass-transition point). In this regard, such materials would be considered high-viscosity heated/"molten" materials. Low-viscosity molten materials such as those herein, often utilize small (e.g. non-polymeric) molecules as the structurant that melt and/or dissolve when heated. Examples of cosmetic products that utilize small-molecule structurants include Engineered Solid Forms (such as those disclosed in U.S. Pat. No. 10,450,530), wax-based solids, hot-melt soaps (such as those disclosed in U.S. Pat. No. 7,811,553), and the like.

Tables 1 and 2 below list cosmetic product formulations for Engineered Solid Forms that utilize small molecule structurants and that form low-viscosity molten materials when heated above the melt-point of the structurant (e.g., 75° C.).

TABLE 1

| Ingredient (% w/w) | Ex. 1 | Ex. 2 | Ex. 3 | Ex. 4 | Ex. 5 | Ex. 6 | Ex. 7 |
|---|---|---|---|---|---|---|---|
| Polyox WSR coag | — | 10 | — | 5 | 20 | 15 | — |
| Polyox N60k | 30 | — | 15 | 5 | — | — | 15 |
| Silwet L7210 * | 45 | — | 20 | 20 | 45 | — | 45 |
| Softcat SL5 ** | — | — | 10 | — | — | — | — |
| Nhance 3196 *** | — | 10 | — | — | — | — | — |
| Petrolatum | — | 50 | — | — | 20 | 30 | — |
| DC200, 350 cst $ | — | — | 20 | — | — | — | — |
| Behenyl Alcohol | 25 | 30 | 35 | 50 | 35 | 30 | 35 |
| Mineral Oil | — | — | — | — | — | 20 | — |
| Lauric Acid | — | — | — | — | — | 2.5 | — |
| Ceteareth-20 | — | — | — | — | — | 2.5 | 5 |
| Total | 100 | 100 | 100 | 100 | 100 | 100 | 100 |

\* Available from Momentive
\*\* Available from Dow Chemicals
\*\*\* Available from Ashland
$ Available from Dow Corning

TABLE 2

| Ingredient (% w/w) | Ex. 8 | Ex. 9 | Ex. 10 | Ex. 11 | Ex. 12 | Ex. 13 |
|---|---|---|---|---|---|---|
| Polyox WSR coag | 15 | — | 30 | 15 | 25 | 30 |
| Polyox N60k | 15 | 25 | — | — | — | — |
| Silwet L7210 * | — | — | 19.5 | — | — | — |
| Softcat SL5 ** | — | — | — | — | — | — |
| Nhance 3196 *** | — | 5 | — | — | — | — |
| Petrolatum | 39 | 15 | 20 | 50 | 34.5 | — |
| Sunflower wax | — | — | — | — | — | 30 |
| Behenyl Alcohol | 30 | 35 | 30 | 30 | 30 | — |
| Pluronic F127 | 1 | 0.5 | 0.5 | 5 | 0.5 | 0.5 |
| Soybean Oil | — | — | — | — | — | 39.5 |
| Mineral oil | — | 19.5 | — | — | — | — |
| lauric acid | — | — | — | — | 5 | — |
| Ceteareth20 | — | — | — | — | 5 | — |
| Total | 100 | 100 | 100 | 100 | 100 | 100 |

\* Available from Momentive
\*\* Available from Dow Chemicals
\*\*\* Available from Ashland
Available from Cargill
@ Available from Koster Keunen Table 3 below lists cosmetic product formulations for melt formed soaps that utilize small molecule structurants and that form low-viscosity molten materials when heated above the melt-point of the structurant. Melt formed soap compositions are disclosed in U.S. Pat. No. 7,811,553.

TABLE 3

| Ingredient (% w/w) | Ex. 11 | Ex. 12 | Ex. 130 | Ex. 14 |
|---|---|---|---|---|
| Dipropylene Glycol | 23.55 | 14.00 | 13.50 | 14.0 |
| Water | 9.75 | — | — | — |
| Sorbitol | 8.00 | — | — | — |
| Glycerin | 8.00 | 29.00 | 25.90 | 28.9 |
| Behenyl Alcohol | — | — | 1.10 | — |
| Stearic Acid | — | 3.00 | — | 3.0 |
| Microcrystalline Wax | — | 1.00 | 0.50 | 1.0 |
| Cocamidopropyl Betaine | — | 6.00 | 11.00 | 6.0 |
| Sodium Lauryl Ether Sulfate (25% active) | 8.00 | 12.00 | 6.00 | 12.0 |
| Steareth-21 | — | — | 5.00 | — |
| Methocel | — | — | 1.00 | — |
| Tetramethylhydroxypiperidinol Citrate | 0.50 | — | — | — |
| Sodium Stearate | 30.00 | 28.00 | 30.00 | 28.0 |
| Polybutene/polyethylene/mineral oil | 4.00 | — | — | — |
| Olive, avocado and kokum butter | 5.00 | — | — | — |
| Shea butter | — | 1.00 | 1.00 | 1.0 |
| Vinyl dimethicone/methicone silsesquioxane cross-polymer | 1.00 | — | — | — |
| Polyquaternium-10 | 0.10 | — | — | — |
| Vitamins | 0.50 | — | — | — |
| POLYOX ® (MW = 300,000) | — | — | 0.50 | — |
| POLYOX ® (MW = 1,000,000) | 0.50 | — | — | — |
| POLYOX ® Coagulant (MW = 5,000,000) | — | 5.00 | 3.50 | 5.0 |
| Dye and Fragrance | 1.1 | 1.1 | 1.1 | 1.1 |

Materials herein can comprise multiphase materials. A multiphase material may include two substantially immiscible phases (e.g. a hydrophilic phase and a hydrophobic phase). A multiphase material comprising two immiscible phases may include a continuous phase and a dispersed phase. For example, the multiphase material may comprise a hydrophilic phase dispersed in a hydrophobic phase or a hydrophobic phase dispersed in a hydrophilic phase. A multiphase material may include a particulate phase suspended in a continuous phase. The multiphase material may include polyethylene oxide polymers (e.g., DuPont POLYOX™), as the dispersed phase or as the particulate phase.

It is understood injection molding may include conventional injection molding processes utilizing a screw and barrel or a barrel and plunger. Injection molding low-viscosity materials can present challenges versus high-viscosity materials. For example, suspended solids in such low-viscosity materials can settle during processing and/or during cooling of the material in the mold to form the article. The methods and apparatus of the present invention resolve this problem on the one hand by maintaining recirculation of the material prior to injecting the material into the mold and thus material recirculation as described herein can be utilized to maintain even distribution of suspended solids within such low-viscosity materials.

Figure 2:
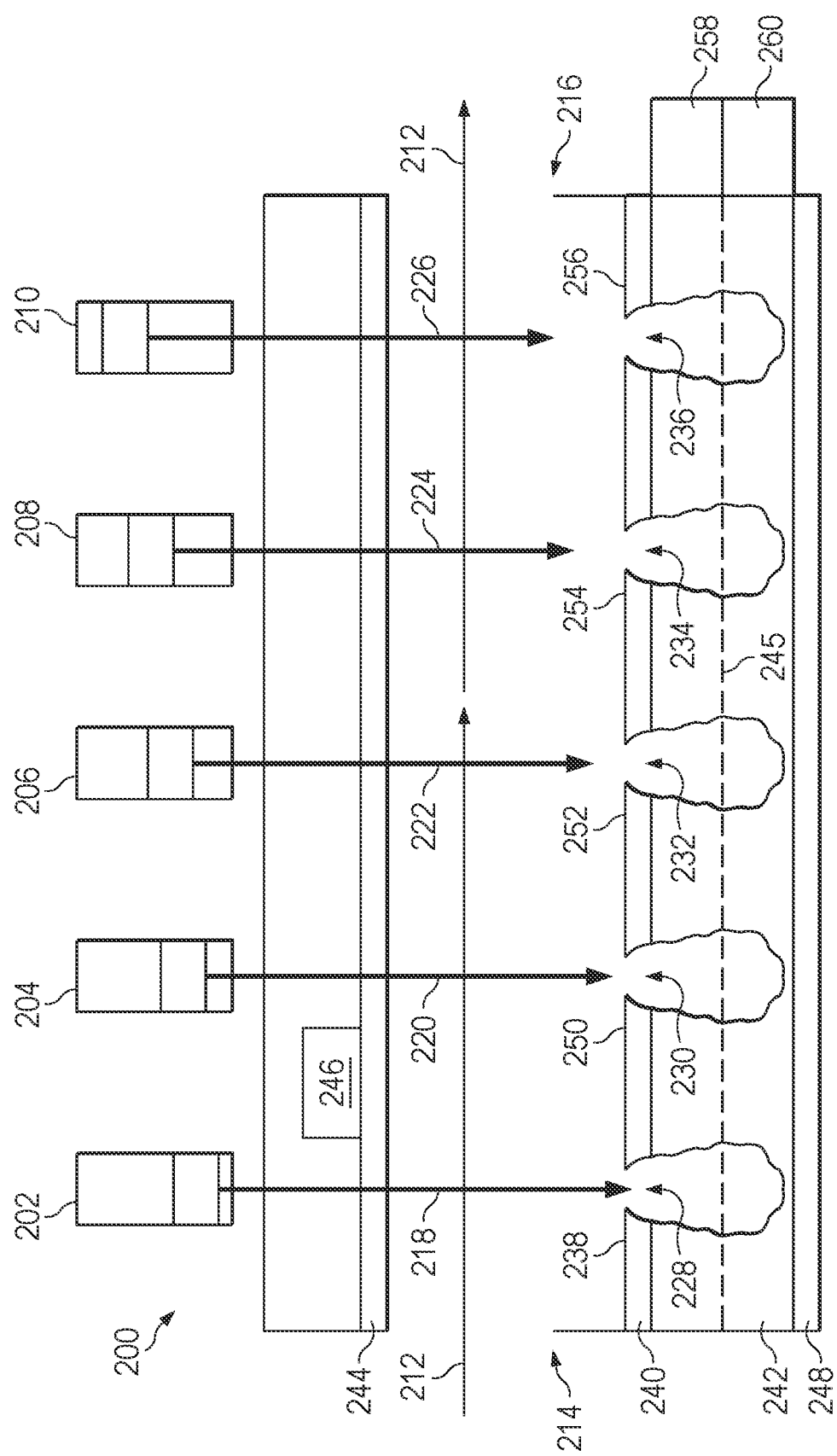
FIG. 2 is a block diagram of a non-limiting manifold in accordance with one or more embodiments described herein.

Turning now to FIG. 2, there is illustrated an example, non-limiting manifold 200 in accordance with one or more embodiments herein. The manifold 200 can comprise actuators 202, 204, 206, 208, and/or 210. One or more of the actuators 202, 204, 206, 208, and/or 210 can engage with an injection valve (e.g., one or more of injection valves 218-226). In this regard, actuator 202 can engage with injection valve 218. Actuator 204 can engage with injection valve 220. Actuator 206 can engage with injection valve 222. Actuator 208 can engage with injection valve 224. Actuator 210 can engage with injection valve 226. It is noted that in some embodiments, actuators can comprise injection valves as a single assembly. Actuators herein (e.g., 202, 204, 206, 208, and/or 210) can extend or retract associated injection valves 218, 220, 222, 224, and/or 226 in order to close or open respective valve gates 238, 250, 252, 254, and/or 256 (collectively the "valve gates"). It is noted that the injection valves 218, 220, 222, 224, and/or 226 can retractably contact the valve gates 238, 250, 252, 254, and/or 256 that, when in contact with the injection valves 218, 220, 222, 224, and/or 226, prevent material flow into respective cavities. In this regard, closed valve gates can prevent material flow into one of the respective cavities 228, 230, 232, 234 and/or 236. Open valve gates can enable material flow into a respective cavity. According to an example, injection valve 218 is depicted as extended to close valve gate 238. In this example, injection valve 226 is retracted to open valve gate 256.

It is noted that one or more of the actuators 202, 204, 206, 208, and/or 210 (collectively, the "actuators") can comprise pneumatic actuators, hydraulic actuators, or other types of actuators. In other embodiments, the actuators 202, 204, 206, 208 and/or 210 can be servo-controlled. For example servo-controlled actuators can be utilized to precisely and/or independently control material flow into a cavity by regulating, for instance, valve speed, valve travel distance, compression, etc. applied by the servo-controlled actuators. In an embodiment, actuators 202, 204, 206, 208 and/or 210 can independently control the injection valves 218, 220, 222, 224, and/or 226 during injection.

According to an embodiment, the injection valves 218, 220, 222, 224, and/or 226 can be closed between injection cycles. In various embodiments, recirculation of the material in the manifold 200 can be performed continuously or continually (e.g., intermittently) between injection cycles.

It is noted that material (e.g., cosmetic material) can flow through openings 214 and 216 of the manifold 200. In this regard, it is noted that the material can flow through openings 214 and 216 for continuous or continual (e.g., intermittent) recirculation of the material. It is noted that injecting material into the mold at a controlled pressure can comprise pumping material into and out of the manifold 200 which, according to an embodiment, can occur continuously during injection of the material or intermittently during injection of the material. In an embodiment, intermittent pumping or recirculation can occur before or after injecting material.

It is noted that opening 214 can comprise a supply passage and opening 216 can comprise a return passage. The effective cross section and total length of passages are sized to minimize total volume balanced with the constraints of required recirculation flow rate, material rheology and pressure to achieve the recirculation flowrate. In the case of suspended solids or droplets, the minimum passage size may need to be at least 4 to 8 times greater than the maximum particle or droplet size to minimize the likelihood of particle jamming.

Controlling the flow of the material through the apparatus, including the manifold, and in particular controlling the residence-time of the material in a heated apparatus or system, can help prevent problems such as material clogging, burning, degradation, or other problems. Residence-time can be a significant contributor to thermal degradation of heat-sensitive materials. Material residence-time in the apparatus can also be controlled by limiting the overall volume of the apparatus and/or the manifold including by limiting the overall volume of the apparatus and/or manifold relative to the cavity volume and/or the mold volume.

According to an embodiment, a thermal barrier 240 can be disposed between the manifold 200 and mold 242. According to an embodiment, the thermal barrier 240 can be located between each cavity 228, 230, 232, 234, and/or 236. It is noted that the thermal barrier 240 can comprise an insulative layer comprising low thermal conductivity that prevents the flow of thermal energy between the manifold 200 and mold 242. Examples of insulating materials are an air/vacuum gap, glass or mineral-based wool/fibers, inorganic aerogels, and low thermal conductivity polymer or polymeric foams. In this regard, temperature variances between the manifold 200 and mold 242 can be realized, for instance, to allow molten material in the mold 242 to cool and harden without reducing the temperature of molten material circulating through the manifold 200 (e.g., in direction 212). It is noted that by recirculating material (e.g., material 310 as later discussed) through openings 214 and 216, material can be consistently injected into the cavities 228, 230, 232, 234, and/or 236. Without molten material recirculation, residence time in an injection system can cause material separation, thermal degradation, or product solidification. Such problems would be prevalent, for example, when injection molding a low-viscosity material with a conventional hot runner injection mold manifold. According to an embodiment, the material can flow in direction 212, however, it is noted that material can flow in the opposite direction in other embodiments.

In an embodiment, the mold 242 can comprise a thermal jacket 248 (e.g., a water jacket), which can be utilized, for instance, to actively or passively regulate the temperature of the mold such as to cool the mold 242. Depending on the desired solidification conditions and cycle time, mold temperature can be 2-20° C. lower than the product solidification temperature of the material for relatively slow cooling, or could be 20-60° C. lower than the solidification temperature of the material for relatively rapid cooling. For lower cooling temperatures, a coolant such as water/glycol, or cryogenic fluids or refrigerant gas/liquid can be utilized to cool the mold. Such cooling can facilitate, for example, material solidification and impact material crystal formation and growth within the mold 242, which can further impact settling of the dispersed phase for a multiphase material. In other embodiments, the thermal jacket 248 can heat the mold 242. In other embodiments the thermal jacket 248 can alternately heat and cool the mold. It is noted that material cooling herein can occur passively via time exposure to ambient temperature or actively (e.g., with a thermal jacket 248). It is further noted that manifolds and/or molds herein can comprise one or more thermal jackets 248 (e.g., a heating jacket and/or a cooling jacket).

According to an embodiment, the actuators 202, 204, 206, 208, and/or 210 can retract the injection valves away from the one or more of cavities 228, 230, 232, 234, and/or 236 (collectively the "cavities") in order to allow material to flow from the manifold 200 into the cavities 228, 230, 232, 234, and/or 236 of the mold 242. In FIG. 2, injection valve 218 is closed such that the flow of the material 310 is blocked. However, injection valve 226 is open, allowing material 310 to flow into the cavity 236.

The injection molding methods and apparatus of the present invention offer distinct advantages over conventional deodorant/antiperspirant, lip balm, etc. formation processes that provide molten material directly into the containers for use by the consumer through a standard filler. Such embodiments include filling the container, generally at atmospheric pressure, and result in the article being only partially formed, in that at least a portion of the article is exposed to ambient conditions during cooling. This portion generally forms a meniscus rather than being formed by a mold. Injection molding also allows the article to be formed directly on a housing (e.g., housing 20), for example a housing of a razor cartridge. In various embodiments herein, articles formed (e.g., from material 310) are ejected from a mold and thus are not formed directly on the cartridges, but rather formed on the housing and attached to the cartridge as part of a later assembly operation. For instance, articles formed from material 310 can be removed from one or more of the mold cavities and inserted into a razor housing. It is noted that the housing can comprise more than one article formed thereon. The housing may include two articles formed thereon which may comprise the same or different material. The injection molding apparatus of the present invention may comprise two or more separate recirculation loops (e.g., material passages) supplying different materials to the mold, such as via separate manifolds.

The housing may comprise an applicator, such as a stick or comb (or other applicator) that is not intended for further attachment to a device such as a hair removal device such as a razor. The article may be formed onto the applicator similarly to it being formed onto the housing. The applicator may be used to apply the material of the article directly to the skin or other surface to be treated. In this regard, embodiments and processes herein can differ from conventional cosmetic, deodorant, and/or antiperspirant formation processes. According to an embodiment, the material 310 can be injected to attach an article to a substrate material (e.g., a substrate material received in a mold cavity) such as the housing or the applicator. It is noted that a second material (e.g., other than the material 310) can be injected onto the substrate material (e.g., during two-shot or transfer molding onto/around a housing). Substrates herein can comprise rigid polymers, elastomers, thermoplastic polymers, or other suitable materials. For instance, a shaving razor 10 can comprise multiple shaving aid components 60, each shaving aid component comprising a different material.

It is noted that associated apparatuses and systems can comprise a recirculation valve (e.g., back-pressure regulator 308, or shutoff valve 402 as later discussed in greater detail) which can enable or prevent material flow through the opening 214 and/or opening 216. Such a recirculation can be opened or closed in order to enable or prevent the material flow through the apparatus and/or the manifold. It is noted that the recirculation valve can be operated according to injection cycles. For instance, the recirculation valve can be opened at the beginning of an injection cycle to allow material to flow into the manifold 200. The recirculation valve can then be closed, and the material can be injected past open injection valves (e.g., injection valve 218, 220, 222, 224, and/or 226) into mold cavities (e.g., cavities 228, 230, 232, 234, and/or 236). It is noted that the recirculation valve (e.g., when the recirculation valve comprises a back-pressure regulator 308) can be fully closed or partially closed when the injection valves are open. Briefly or partially closing the back-pressure regulator 308 can increase back-pressure which can enable material to flow into one or more mold cavities (e.g., cavities 228, 230, 232, 234, and/or 236) when the injection valves open. The injection valves can then be closed after injecting the material into the mold cavities. Alternately or additionally, material herein can be injected at a controlled pressure (e.g., above ambient pressure) to volumetrically fill one or more of the mold cavities (e.g., cavities 228, 230, 232, 234, and/or 236) utilizing actuators 202, 204, 206, 208, 210, 302, or a piston pump (e.g. 404 or 504) such as a servo-controlled piston pump. The one or mold cavities can then be opened, and the articles formed from the material can be removed (e.g., after cooling and solidifying).

The disclosed apparatus and method may be especially advantageous for smaller molded articles because increased residence times may result in issues related to heat degradation and settling of multiphase materials within conventional manifolds. In this regard, residence time herein is reduced, for instance, by minimizing total material (e.g., material 310) located within an injection molding apparatus described herein. This can maintain a relatively low ratio of system volume to injection volume ratio as compared to conventional injection molding systems. It is noted that articles herein can be small in order to minimize heat degradation and settling. In this regard, mold cavities herein (e.g., cavities 228, 230, 232, 234, and/or 236) can be correspondingly small (e.g., in order to mold components for cosmetic products such as razor components).

A thermal jacket 244 (e.g., a water jacket) can be utilized to regulate/maintain a temperature within the apparatus and/or the manifold specifically. A desired temperature can be above the solidification point of the material, such as about 0.5° C., to about 2° C. above the solidification point of the material to ensure it remains fluid up to the point of injection and in the recirculating pathways. The temperature may be maintained at different levels in different portions of the manifold 200 or associated apparatuses or systems. It can be advantageous to minimize the product temperature so as to reduce any product degradation or evaporation, as well as minimize the sensible heat to be removed once injected into the mold to get to the solidification point in forming the article. It is noted that the thermal jacket 244 can be heated or cooled with the temperature regulator 246 (e.g., a heater or cooler or a combination heater/cooler), which can be a component of the manifold 200 or can be externally located or mounted. In this regard, the manifold 200 can comprise a temperature controlled manifold. For instance, the temperature regulator 246 can be in-line with an associated material recirculation apparatus or at an associated pump, tank, or other component. The thermal jacket may be outward of the apparatus or may include portions that are inserted into the apparatus (i.e. the holding container or the recirculation tank) or may include conduits that run through the apparatus (e.g. channels through the manifold)

It is noted that the thermal jacket 244 or thermal jacket 248, or other thermal jackets can comprise a thermally conductive fluid that travel throughout other various apparatuses or associated components. It is noted that conventional hot runner systems typically use electric heat rather than thermal jackets described herein, and such electric heaters do not distribute heat as efficiently and as evenly as thermal jackets herein.

It is noted that the method for molding the materials discussed herein can comprise temperature ranges to be maintained for injection molding herein. In this regard, materials herein can be injected above ambient temperature and/or pressure. For example, an Engineered Solid Form can require an injection molding temperature range of 72 degrees Celsius (° C.)-76° C., though other temperature ranges can be applicable (e.g., for Engineered Solid Forms or other materials). According to an embodiment, a recirculation system can maintain materials at approximately 1-2° C. above a melting temperature. Significant deviation from specified temperatures could lead to adverse material solidification.

According to an embodiment, the mold 242 can comprise an opener 258. The opener 258 can separate one or more mold cavities or sections of the mold 242 (e.g., by opening cavities or section(s) of the mold 242 in opposing direction(s) or hinging sections of the mold 242. The mold 242 may open along the parting line 245 (e.g. a dividing line that splits the core and cavity halves of a molded part). Once open, ejector 260 can eject one or more articles (e.g., cosmetic products) from one or more mold cavities or from the mold 242.

Figure 3:
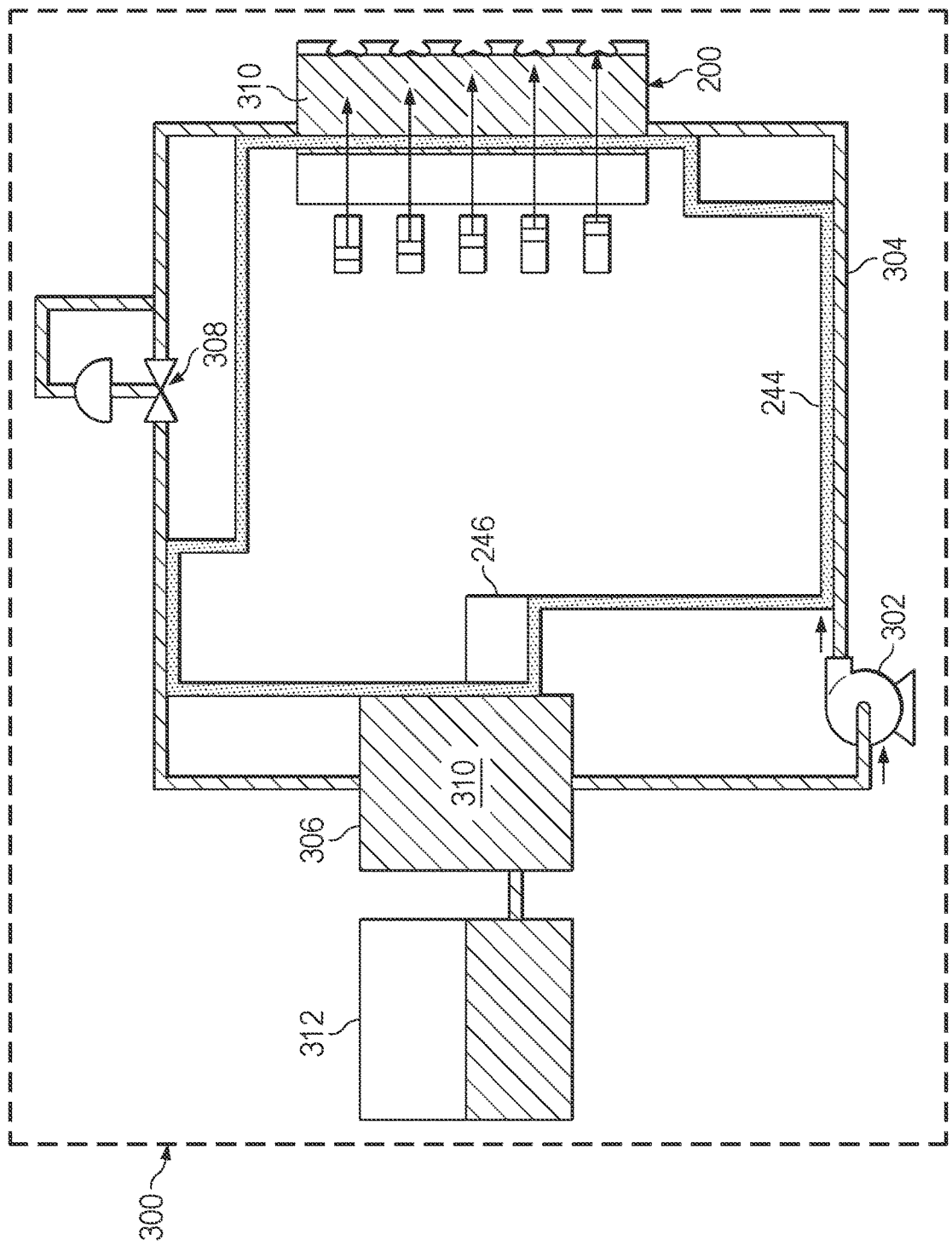
FIG. 3 is a block diagram of a non-limiting injection molding apparatus that facilitates injection molding of low-viscosity materials in accordance with one or more embodiments described herein.

With reference to FIG. 3, there is a block diagram of a non-limiting injection molding apparatus 300 that facilitates injection molding of low-viscosity materials in accordance with one or more embodiments described herein. According to an embodiment, the injection molding apparatus 300 can comprise an apparatus for forming a personal care product such as a lubricating member for a hair removal device such as a razor.

It is noted that injection molding apparatus 300 can utilize time-pressure fill. Time-pressure filling may include partially or fully interrupting the recirculation during injecting the molten material into the one or more molds. In an embodiment, a recirculation valve may comprise a back-pressure regulator. It is noted that, according to an embodiment, Time-Pressure filling does not necessarily stop recirculation. A back-pressure regulator 308 can set the fill pressure and the injection valves 218, 220, 222, 224, and/or 226 can open for the amount of time it takes to "pack out" the mold cavities 228, 230, 232, 234 and/or 236 before solidifying. In this regard, delivery of material 310 to the mold cavities 228, 230, 232, 234 and/or 236 can be pressurized and can occur over a defined period of time. The back-pressure regulator 308 can comprise a valve that, for example, only opens or closes as much as necessary to maintain a specified system pressure (e.g., of an injection material). In this regard, the back-pressure regulator 308 can maintain pressure (e.g., second pressure) within a cavity of the mold (e.g., mold 242) to ensure complete filling of the mold and/or to ensure proper adherence of the article to the housing or applicator or other support. Pressure ranges can be dependent upon the material molten viscosity, desired injection cycle time, minimum recirculation flowrate, and/or pressure drop across the supply manifold and injection valves and injection nozzles. For a lower viscosity molten material (e.g., <1,000 cP), pressures may be 1-20 Bar. In some embodiments, the back-pressure regulator 308 can be partially opened or partially closed.

Recirculation pump 302 can comprise a constant flow recirculation pump which can push and pressurize material within the injection molding apparatus 300. A recirculation tank 306 can be included in the apparatus and fluidly connected to the recirculation pump 302 (e.g., via material passages 304). It is noted that the material passages 304 can comprise a recirculation loop. It is additionally noted that a return line or return passage can comprise a section of the material passages 304 (e.g., a recirculation loop) configured to move or circulate material 310 that passes through the manifold 200 without being injected. A supply passage can comprise a section of the material passages 304 configured to move or circulate material 310 prior to entering the manifold 200. In other embodiments, the material passages 304, recirculation tank 306, manifold 200, and other associated components can collectively comprise a recirculation system or loop. It is noted that material 310 herein can be continuously recirculated through the recirculation loop and/or recirculation tank 306. It is noted that opening 214 can comprise a supply passage and opening 216 can comprise a return passage. In this regard, the openings 214 and 216 can be in fluid communication with one or more injection valves 218, 220, 222, 224, and/or 226.

The recirculation tank 306 can store excess material within the injection molding apparatus 300. Temperature within the recirculation tank 306 can be regulated/maintained, for instance, with a water jacket (e.g., a thermal jacket 244), for example to temperatures between 72° C.-76° C. It is noted that the apparatus including the thermal jacket can comprise a temperature regulator (e.g., a temperature regulator 246) which can regulate the temperature within the recirculation tank 306 and/or thermal jacket 244. It is noted that though the injection molding apparatus 300 (and similarly apparatuses 400 and 500) is depicted as a closed-loop system, material 310 can be added at one or more locations of the apparatus, such as at recirculation tank 306 or holding container 312, as material 310 is depleted due to injection and ultimately the formation of articles. In an embodiment, the recirculation tank 306 can be thermally connected to the temperature regulator 246 which, according to an embodiment, can heat material 310 prior to moving through the apparatus and the manifold 200.

According to an embodiment, total fillable volume within the cosmetic product injection molding apparatus can be less than a defined volume. Total fillable volume can include the aggregated volume within one or more of recirculation pump 302, material passages 304, manifold 200, recirculation tank 306, back-pressure regulator 308, holding container 312, and/or another component of the injection molding apparatus 300.

The injection molding apparatus 300 can comprise manifold 200. The recirculation pump 302 can generate pressure (e.g., a first pressure) which can be regulated by the back-pressure regulator 308. According to an embodiment, the injection valve (e.g., 218, 220, 222, 224, and/or 226) can be held open (e.g., retracted) for a set amount of time. The time can be dependent on the pressure, molten material viscosity, part volume and/or desired overall cycle time. It is noted that part volumes herein can be small or light weight (e.g., 1-10 grams) and part volume (e.g., cycle volume) of all mold cavities combined compared to apparatus volume can be low. It would be appreciated that the total volume of the mold cavities is a function of the individual cavity volume and the number of cavities in the mold. A low total mold volume can include a larger number of smaller cavities or a smaller number of larger cavities. Typical injection cycle times for lower viscosity (e.g., <1,000 cP) and a 1 cc part (e.g., single part material volume) can be less than 1 second. It is noted that closure of the injection valves 218, 220, 222, 224, and/or 226 can prevent flow of material 310 into a cavity or leakage of material 310 into a cavity (e.g., 228, 230, 232, 234, and/or 236).

It is noted that apparatus and methods herein may include one or more mold cavities with a volume per cavity defined as "part volume", and in the case of more than one mold cavity, a combined total fillable volume per cycle defined as "part cycle volume". This is the part volume injected to each mold cavity multiplied by the number of cavities injected each cycle. For example, a part volume of 0.2 cubic centimeters (cc) with a single cavity would have a part cycle volume of 0.2 cc. In another example, a part volume of 0.8 cubic centimeters (cc) with 32 cavities would have a part cycle volume of 25.6 cc. The part cycle volume multiplied by the number of cycles per minute is therefore the average volumetric flow rate of material being injected to make parts and is defined as "part volumetric flowrate" with units of cubic centimeters per minute (cc/min). For example, with a part cycle volume of 0.2 cc, and a cycle time of 15 seconds which is 4 cycles per minute, the part volumetric flowrate is 0.8 cubic centimeters per minute (cc/min). In another example, with a part cycle volume of 25.6 cc, and a cycle time of 20 seconds which is 3 cycles per minute, the part volumetric flowrate is 76.8 cubic centimeters per minute (cc/min). The preferred embodiment would have a part volume from about 0.1 cc to 5 cc, more preferably from about 0.1 cc to 1 cc. While there could be only 1 cavity molded per cycle, the preferred embodiment would have about 4 to 128 cavities, more preferably from about 8 to 32 cavities. This would result in a part cycle volume as low as about 0.1 cc per cycle, to as much as about 640 cc per cycle. The preferred embodiment would have a part cycle volume from about 0.4 cc per cycle to about 128 cc per cycle, and more preferably from about 0.8 cc per cycle to about 32 cc per cycle.

While it is desirable to have the shortest possible cycle time, there are mechanical operations, mass transfer and heat transfer limitations that will govern the minimum cycle time, and part quality considerations that may necessitate a longer cycle time. The preferred embodiment would have a cycle time from about 6 seconds to about 60 seconds, more preferably from about 5 seconds to about 12 seconds. In terms of "part volumetric flowrate" defined above, the preferred embodiment would have a part volumetric flowrate from about 0.1 cubic centimeters per minute (cc/min) to about 6,400 cc/min, more preferably from about 0.8 cc/min to about 320 cc/min.

A further advantage of the apparatus and methods herein over hot runner injection molding manifolds is the minimization of thermal and/or compositional non-uniformities such as material temperature gradients or separation. In the case of a conventional hot runner injection manifold, once the material enters the manifold and hot runner passages, it can only leave the manifold by 1 or more injection points, so must either fill a part cavity, or be purged through the injection port. Furthermore, the material is only flowing when making a part or purging and is otherwise not flowing between cycles or during a planned or unplanned stop of the injection cycle.

Material compositions described herein as well as polymeric materials commonly injection molded typically have low thermal conductivity and can develop temperature gradients normal to the flow direction, as well as along the flow direction if the heat source has temperature gradients. Additionally, material compositions described herein as well as polymeric materials commonly injection molded have non-Newtonian rheology with viscosity dependent on shear rate. By continuously flowing material through a manifold, and supply system, the material can be maintained homogenous and is isolated from undesired effects of thermal and compositional non-uniformity that develop with intermittent flow and planned and unplanned stops of the injection cycle. This enables a narrow and known average residence time of material throughout the total volume contained in the manifold and system that can be tightly controlled by purging and replenishing with new material.

The apparatus and methods herein have significant advantages for cleaning or changeover to another material since the flow velocity through the manifold can be increased to achieve transitional and turbulent flow regimes to increase effectiveness, and the cleaning medium can be recirculated to minimize the volume of medium used. This cleaning can be fully automated and done without the need to remove or disassemble any system components.

According to an embodiment, the injection molding apparatus 300 can comprise a holding container 312. It is noted that the holding container 312 can store excess material 310 to be added to the apparatus such as via the recirculation tank 306 or material passages 304 (e.g., recirculation passages including openings 214 and 216). In this regard, material 310 can be pumped from the holding container 312 into the recirculation tank 306. In some embodiments, material 310 can be heated before being introduced to the holding container, while in the holding container or between the holding container and the recirculation loop and/or tank (e.g., with a temperature regulator 246 or a different heating component). According to an example, the holding container 312 can range from 1-120 liters in capacity, though other sizes of holding containers 312 can be utilized such as 20 liter holding containers 312. Is it noted that material 310 can comprise a paste at an ambient temperature (e.g., when inside the holding container 312) and may not be heated prior to transferring to the apparatus. At ambient temperature, the material 310 in paste-form can prevent solids from settling.

The holding container 312 can be further utilized as a mixing container, for example to combine a first phase and a second phase of material to form a multiphase material 310. For instance, a solid (e.g., a powder) and a liquid can be combined in the holding container 312. In this regard, the material 310 can be formed by combining a first hydrophobic phase and a second hydrophilic phase. According to an embodiment, more of the material 310 can be added to the holding container 312 during injection or at a different point in time. In other embodiments, material 310 can be added at a different part of the injection molding apparatus 300.

In an embodiment, the apparatus for forming the personal care product can comprise a recirculation pump, one or more valves for controlling recirculation flow and pressure, one or more valves for purging material from the system, a material reservoir with mixing, a means of replenishing the system with fresh material, interconnecting temperature controlled piping, instrumentation for temperature/flow/pressure, a control system, one or more injection valves and one or more piston pumps. Additionally, the apparatus would have the provision to be cleaned in place (CIP) and/or sanitized in place (SIP) so would also include one or more valves to add and completely remove a cleaning and/or sanitization medium. The preferred embodiment would incorporate sanitary design principles commonly used in food, drug and cosmetic process equipment to facilitate cleaning and minimize the risk of microbiological contamination.

Figure 4:
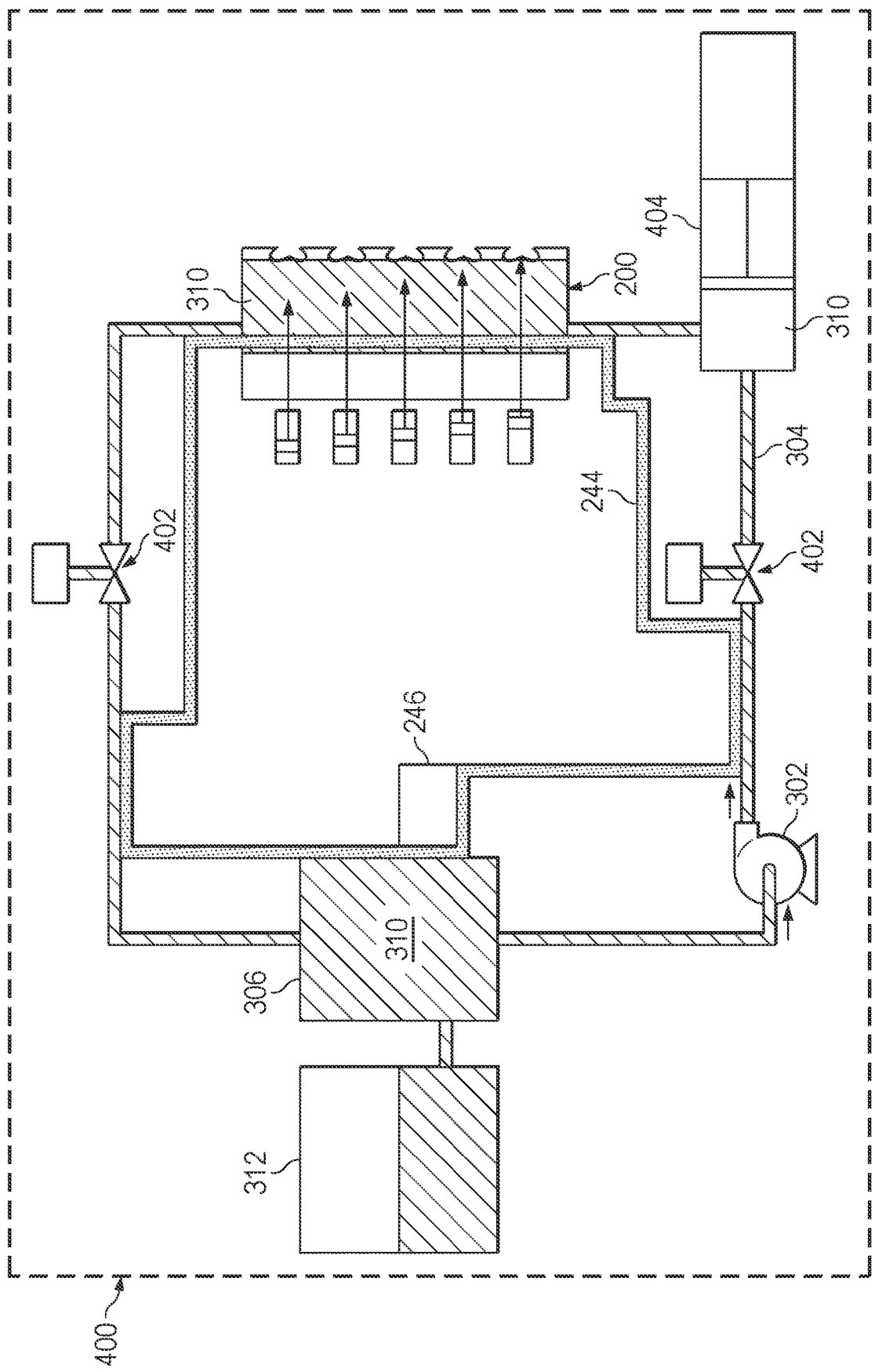
FIG. 4 is a block diagram of a non-limiting injection molding apparatus that facilitates injection molding of low-viscosity materials in accordance with one or more embodiments described herein.

FIG. 4 is a block diagram of a non-limiting injection molding apparatus 400 that facilitates injection molding of low-viscosity materials in accordance with one or more embodiments described herein. It is noted that injection molding apparatus 400 can utilize single pump volumetric fill. Injection molding apparatus 400 can be similar to injection molding apparatus 300, however, injection molding apparatus 400 can comprise a shutoff valve 402 instead of the back-pressure regulator 308. During a recirculation phase, recirculation pump 302 repeatedly draws material from the recirculation tank 306 and circulates material through the recirculation loop (e.g., material passages 304), through the manifold 200 and the (optional) shutoff valve 402, and then back into the recirculation tank 306. During a filling phase, the recirculation pump 302 can draw a defined volume of material from the recirculation tank 306 with the valves (e.g., injection valves 218, 220, 222, 224, and/or 226) in a closed position. It is noted that a closed position can include venting the mold. Next, the injection valves (e.g., injection valves 218, 220, 222, 224, and/or 226) can open. Finally, a piston pump 404 can dispense the defined volume of material at a controlled flow rate into all of the mold cavities 228, 230, 232, 234, and/or 236. It is appreciated that while FIG. 4 depicts the piston pump as being external to the manifold, the piston pump may alternately be integral to the manifold.

Figure 5:
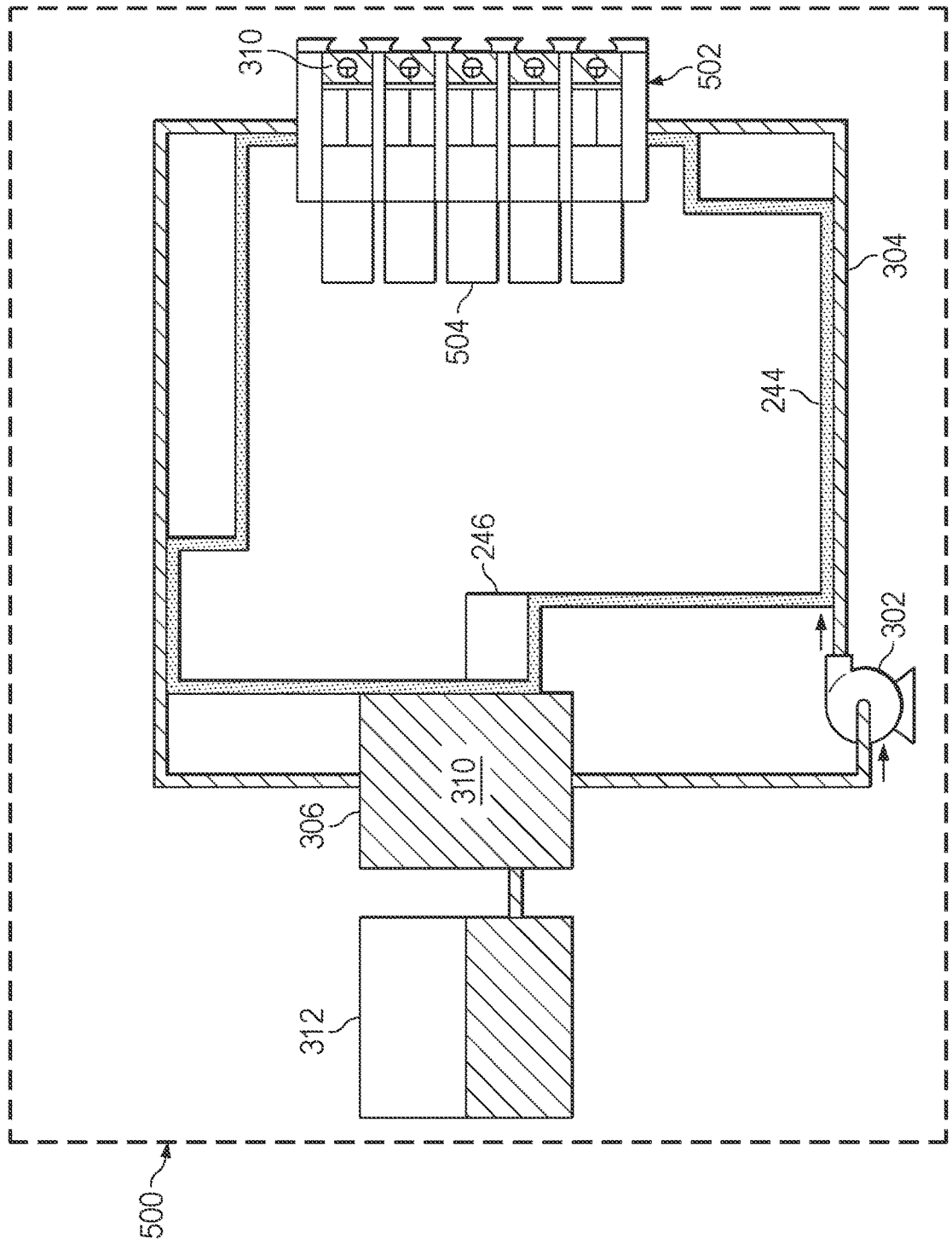
FIG. 5 is a block diagram of a non-limiting injection molding apparatus that facilitates injection molding of low-viscosity materials in accordance with one or more embodiments described herein.

FIG. 5 illustrates a block diagram of a non-limiting injection molding apparatus 500 that facilitates injection molding of low-viscosity materials in accordance with one or more embodiments described herein. It is noted that injection molding apparatus 500 can utilize multiple pump volumetric fill. In this regard, material flow for volumetric product delivery can be individually controlled for each cavity (e.g., of a manifold 502). Multiple pumps (e.g., one per cavity) in manifold 502 can each draw defined volumes from the recirculation loop (e.g., material passages 304) into the respective piston pumps 504 (e.g., respective piston pump chambers of the respective piston pumps). The piston pumps can then dispense the material at a controlled flow rate into each mold cavity. The piston pumps can be controlled individually or in concert. Pistons and/or piston pumps may be integrated into the manifold or separate from and fluidly connected to the manifold. According to an embodiment, pumps 504 in injection molding apparatus 500 can comprise servo-controlled piston pumps.

Figure 6:
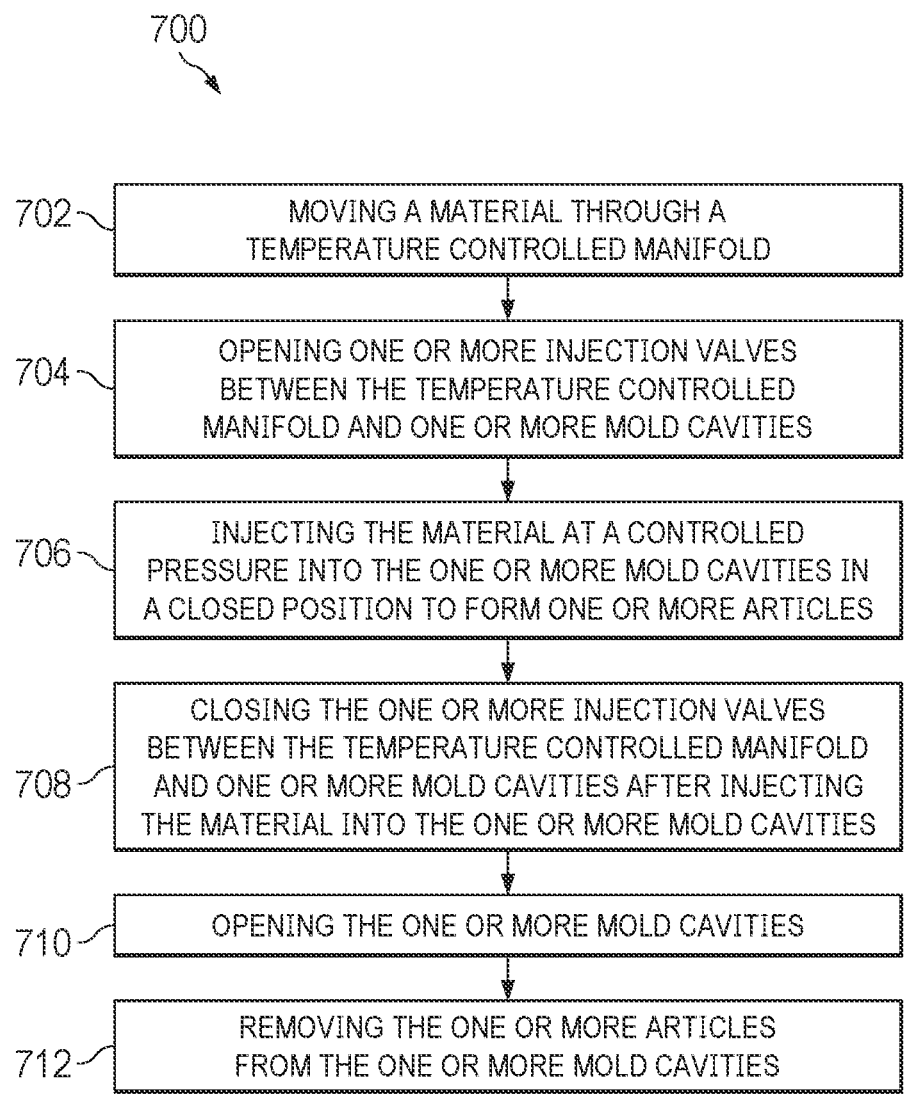
FIG. 6 is a flow diagram illustrating a non-limiting low-viscosity material injection molding process in accordance with one or more embodiments described herein.

FIG. 6 is a flow diagram illustrating a non-limiting low-viscosity material injection molding process 700 in accordance with one or more embodiments described herein. Process 700 can be performed by one or more machines, devices, hardware, or a combination of the same to execute one or more of the described functions/actions. At 702, the process 700 can comprise moving a material through a temperature controlled manifold (e.g., manifold 200). At 704, one or more injection valves (e.g., injection valves 218, 220, 222, 224, and/or 226) located between the temperature controlled manifold and one or more mold cavities (e.g., cavities 228, 230, 232, 234, and/or 236) can be opened. At 706, material (e.g., material 310) can be injected (e.g., at a controlled pressure) into the one or mold cavities in a closed position to form one or more articles. At 708, the one or more injection valves between the temperature controlled manifold and one or more mold cavities can be closed after injecting the material into the one or more mold cavities. At 710, the one or more mold cavities can be opened. At 712, the one or more articles can be removed from the one or more mold cavities.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 millimeters (mm)" is intended to mean "about 40 millimeters (mm)."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

EXAMPLES/COMBINATIONS

A. A method of molding a personal care product comprising:
  moving a material through a temperature controlled manifold;
  opening one or more injection valves between the temperature controlled manifold and one or more mold cavities;
  injecting the material at a controlled pressure into the one or mold cavities in a closed position to form one or more articles;
  closing the one or more injection valves between the temperature controlled manifold and one or more mold cavities after injecting the material into the one or more mold cavities;
  opening the one or more mold cavities; and
  removing the one or more articles from the one or more mold cavities.
B. The method according to Paragraph A, further comprising:
  opening a recirculation valve to the temperature controlled manifold.
C. The method according to Paragraph A or B, further comprising:
  after opening the one or more injection valves, closing the recirculation valve.
D. The method according to any one of Paragraphs A-C, further comprising:
  cooling the material within the one or more mold cavities to form the one or more articles prior to removing the one or more articles from the one or more mold cavities.
E. The method according to any one of Paragraphs A-D, wherein said injecting the material at the controlled pressure comprises continuously pumping the material into and out of the temperature controlled manifold.
F. The method according to any one of Paragraphs A-E, further comprising:
  recirculating the material through a recirculation tank.
G. The method according to any one of Paragraphs A-F, further comprising:
  heating the material prior to moving the material through the temperature controlled manifold.
H. The method according to any one of Paragraphs A-G, further comprising:
  pumping the material from a holding container to a recirculation tank.
I. The method according to any one of Paragraphs A-H, further comprising:
  heating the material between the holding container and the recirculation tank.
J. The method according to any one of Paragraphs A-I, further comprising:
  forming the material by combining a first phase and a second phase.
K. The method according to any one of Paragraphs A-J, further comprising:
  forming the material by combining a first hydrophobic phase and a second hydrophilic phase.
L. The method according to any one of Paragraphs A-K, further comprising:
  adding more of the material to the holding container or to a return line of a recirculation loop, wherein the recirculation loop fluidly connects the temperature controlled manifold and the recirculation tank.
M. A manifold comprising:
  a supply passage for supplying one or more materials;
  a return passage for recirculating the one or more materials; and
  one or more injection valves for filling one or more corresponding mold cavities, wherein the supply passage and the return passage are in fluid communication with the one or more injection valves.
N. The manifold according to Paragraph M, further comprising one or more actuators operatively engaging the one or more injection valves, wherein retraction of the one or more actuators opens the one or more injection valves for volumetric filling of the one or more mold cavities, wherein the one or more injection valves are independently openable and independently closable.
O. The manifold according to Paragraph M or N, wherein the one or more mold cavities removably receive a substrate comprising a material different from the one or more materials.
P. The manifold according to any one of Paragraphs M-O, wherein the manifold comprises a material flow volume less than a defined material flow volume.
Q. A cosmetic product molding apparatus, comprising:
  a recirculation loop comprising a recirculation pump that moves a low-viscosity material through a temperature controlled manifold;
  one or more actuators that:
    open one or more injection valves between the temperature controlled manifold and one or more mold cavities to enable flow of the low-viscosity material at a controlled pressure into the one or mold cavities in a closed position to form one or more articles, and
    close the one or more injection valves between the temperature controlled manifold and one or more mold cavities after the low-viscosity material flows into the one or more mold cavities;
  an opener that opens the one or more mold cavities; and
  an ejector that removes the one or more articles from the one or more mold cavities.
R. The cosmetic product molding apparatus according to Paragraph Q, wherein total fillable volume within the cosmetic product molding apparatus is less than a defined volume.
S. The cosmetic product molding apparatus according to Paragraph Q or R, wherein the recirculation pump continuously recirculates the low-viscosity material through recirculation passages and the temperature controlled manifold during flow of the low-viscosity material into the one or more mold cavities.
T. The cosmetic product molding apparatus according to any one of Paragraphs Q-S, wherein the recirculation pump intermittently recirculates the low-viscosity material through recirculation passages and the temperature controlled manifold during flow of the low-viscosity material into the one or more mold cavities.

What is claimed is:

1. A method of molding a personal care product comprising:
  combining in a holding container a first phase and a second phase of material to form a multiphase material;
  pumping the multiphase material from the holding container to a recirculation tank;
  continuously moving the multiphase material from the recirculation tank through a temperature controlled manifold;
  while continuously moving the multiphase material through the temperature controlled manifold:

opening one or more injection valves between the temperature controlled manifold and one or more mold cavities;

injecting the multiphase material at a controlled pressure into the one or more cavities in a closed position to form one or more articles;

closing the one or more injection valves between the temperature controlled manifold and one or more mold cavities after injecting the multiphase material into the one or more mold cavities;

opening the one or more mold cavities; and removing the one or more articles from the one or more mold cavities.

2. The method of claim 1, further comprising:

opening a recirculation valve to the temperature controlled manifold.

3. The method of claim 2, further comprising:

after opening the one or more injection valves, closing the recirculation valve.

4. The method of claim 1, further comprising:

cooling the multiphase material within the one or more mold cavities to form the one or more articles prior to removing the one or more articles from the one or more mold cavities.

5. The method of claim 1, wherein said injecting the multiphase material at the controlled pressure comprises continuously pumping the multiphase material into and out of the temperature controlled manifold.

6. The method of claim 1, further comprising:

recirculating the multiphase material through a recirculation tank.

7. The method of claim 1, further comprising:

heating the multiphase material prior to moving the multiphase material through the temperature controlled manifold.

8. The method of claim 1, further comprising:

heating the multiphase material between the holding container and the recirculation tank.

9. The method of claim 1, further comprising:

wherein the first phase comprises a first hydrophobic phase and the second phase comprises a second hydrophilic phase.

10. The method of claim 1, further comprising:

adding more of the multiphase material to the holding container or to a return line of a recirculation loop, wherein the recirculation loop fluidly connects the temperature controlled manifold and the recirculation tank.

* * * * *